US012786639B2

(12) United States Patent
Krieg

(10) Patent No.: US 12,786,639 B2
(45) Date of Patent: Nov. 3, 2026

(54) ANTENNA ARRANGEMENT FOR WIRELESS SIGNAL TRANSMISSION AND HEARING DEVICE

(71) Applicant: Sivantos Pte. Ltd., Singapore (SG)

(72) Inventor: Julius Krieg, Olpe (DE)

(73) Assignee: Sivantos Pte. Ltd., Singapore (SG)

( * ) Notice: Subject to any disclaimer, the term of this patent is extended or adjusted under 35 U.S.C. 154(b) by 159 days.

(21) Appl. No.: 18/941,442

(22) Filed: Nov. 8, 2024

(65) Prior Publication Data

US 2025/0150764 A1 May 8, 2025

(30) Foreign Application Priority Data

Nov. 8, 2023 (DE) ..................... 10 2023 211 060.1

(51) Int. Cl.
*H04R 25/00* (2006.01)
*H01Q 1/27* (2006.01)
*H01Q 9/04* (2006.01)

(52) U.S. Cl.
CPC ............. *H04R 25/00* (2013.01); *H01Q 1/273* (2013.01); *H01Q 9/0407* (2013.01)

(58) Field of Classification Search
None
See application file for complete search history.

(56) References Cited

U.S. PATENT DOCUMENTS 10,893,368 B2 1/2021 Nikles et al.
2009/0207091 A1* 8/2009 Anagnostou ........... H01Q 9/285 343/876
2015/0304964 A1 10/2015 Larsson et al.
2016/0373867 A1* 12/2016 Ozden .................. H04R 25/602
2021/0127219 A1* 4/2021 Prabhu ..................... H01Q 1/38

FOREIGN PATENT DOCUMENTS

DE 102018209189 A1 12/2019
EP 2915386 A1 9/2015
EP 2916385 A1 9/2015
GB 2402265 A 12/2004
JP 2009065321 A 3/2009

* cited by examiner

*Primary Examiner* — Antim G Shah

(74) *Attorney, Agent, or Firm* — Laurence A. Greenberg; Werner H. Stemer; Ralph E. Locher

(57) ABSTRACT

An antenna arrangement for wireless signal transmission has an antenna element and a planar substrate. The antenna element is arranged on the substrate. The antenna element has at least one antenna section. The substrate has at least two substrate sections of different substrate types which are arranged in the area of the antenna section, and wherein the antenna section and/or the substrate sections are adjustable relative to one another.

10 Claims, 4 Drawing Sheets

ANTENNA ARRANGEMENT FOR WIRELESS SIGNAL TRANSMISSION AND HEARING DEVICE

CROSS-REFERENCE TO RELATED APPLICATION

This application claims the priority, under 35 U.S.C. § 119, of German Patent Application DE 10 2023 211 060.1, filed Nov. 8, 2023; the prior application is herewith incorporated by reference in its entirety.

FIELD AND BACKGROUND OF THE INVENTION

The invention relates to an antenna arrangement for wireless signal transmission. The invention further relates to a hearing device having an antenna arrangement of this type.

The term "hearing device" generally refers to an electronic device which supports the hearing ability of a person wearing the hearing device. The invention relates in particular to a hearing device which is configured to compensate partially or fully for a loss of hearing of a user with impaired hearing. A hearing device of this type is also referred to as a hearing aid (HA). Hearing devices also exist which protect or improve the hearing ability of users with normal hearing, for example which are intended to enable an improved understanding of speech in complex hearing situations. Such devices are also referred to as personal sound amplification products (PSAP for short). Finally, the term "hearing device" in the sense used here also includes headphones that are worn on or in the ear (wired or wireless, and with or without active interfering noise suppression), headsets, etc., and also implantable hearing devices, such as, for example, cochlear implants.

Hearing devices in general, and hearing aids in particular, are mainly designed to be worn on the head and, here in particular, in or on an ear of the user, in particular as behind-the-ear (BTE) or in-the-ear (ITE) devices. In terms of their internal structure, hearing devices normally have at least one output transducer which converts an audio output signal fed for output purposes into a signal perceptible to the user as sound, and outputs the latter signal to the user.

In most cases, the output transducer is configured as an electroacoustic transducer which converts the (electrical) audio output signal into an airborne sound, wherein this output airborne sound is emitted into the auditory canal of the user. In the case of a hearing device worn behind the ear, the output transducer, also referred to as a receiver, is mainly integrated into a housing of the hearing device outside the ear. The sound output by the output transducer is forwarded in this case by means of a sound tube into the auditory canal of the user. Alternatively, the output transducer can also be arranged in the auditory canal, and therefore outside the housing worn behind the ear. Hearing devices of this type are referred to as "receiver-in-canal" (RIC) devices. Hearing devices worn in the ear which have such small dimensions that they do not protrude outward beyond the auditory canal are also referred as "completely-in-canal" (CIC) devices.

In further types, the output transducer can also be designed as an electromechanical transducer which converts the audio output signal into solid-borne sound (vibrations), wherein this solid-borne sound is emitted, for example, into the cranial bone of the user. Implantable hearing devices further exist, in particular cochlear implants, and hearing devices having output transducers which directly stimulate the auditory nerve of the user.

In addition to the output transducer, a hearing device frequently has at least one (acoustoelectric) input transducer. During the operation of the hearing device, the or each input transducer records an airborne sound from the environment of the hearing device and converts this airborne sound into an audio input signal (i.e. an electrical signal which transports information relating to the ambient sound). This audio input signal—also referred to as a "recorded sound signal"—is normally output to the user himself in original or processed form, e.g. for the implementation of a transparency mode in a headphone, for active interfering sound suppression or—e.g. in the case of a hearing aid—to achieve improved perception of sound by the user.

Furthermore, a hearing device often has a signal processing unit (signal processor). The or each audio input signal is processed (i.e. modified in terms of its sound information) in the signal processing unit. The signal processing unit outputs a correspondingly processed audio signal (also referred to as an "audio output signal" or "modified sound signal") to the output transducer and/or to an external device.

Hearing devices of this type further have, for example, an electromagnetic receiver, for example an antenna element as an RF antenna, by means of which the hearing device is couplable via a signaling connection to an operating element (remote control) and/or to a further hearing device. Due to space constraints, the same antenna element is normally used for transmitting and receiving data.

Hearing devices are preferably designed as particularly space-saving and compact, so that they can be worn by a hearing device user as visually inconspicuous as possible. As a result, smaller hearing devices which are increasingly comfortable to wear are increasingly being manufactured, and are therefore barely perceptible to a user when worn on or in an ear. However, due to the resulting reduced installation space, it is increasingly difficult to accommodate and/or install conventional antenna elements for wireless signal transmission in hearing devices of this type. A further problem exists, for example, in that variability and adjustability of a directional effect of the antenna elements are desirable for different transmission modes.

However, a different setting or configuration of the antenna element normally results in the need to readjust the antenna parameters each time in order to operate the antenna element. A plurality of special antennas are therefore often necessary in order to implement the desired functions in a hearing device, as a result of which a correspondingly increased installation space is required.

Antennas, for example, in which an actuator adjustably moves one antenna arm relative to another antenna arm are known from European patent applications EP 2 916 385 A1 and EP 2 915 386 A1. For precision and manufacturing reasons, this approach is not suitable for miniature antennas of the type used in hearing devices.

SUMMARY OF THE INVENTION

The invention is based on the object of indicating a particularly suitable antenna arrangement. The antenna arrangement is intended to be designed to be as compact as possible, to have a high degree of variability, to be suitable for different transmission modes, and to have an adjustable directional effect. The invention is further based on the object of indicating a particularly suitable hearing device having an antenna arrangement of this type.

In respect of the antenna arrangement, the object is achieved according to the invention with the features of the independent antenna arrangement claim and, in respect of the hearing device, with the features of the independent hearing device claim. Advantageous embodiments and developments form the subject-matter of the dependent claims (subclaims). The advantages and embodiments described with regard to the antenna arrangement are transferable accordingly to the hearing device and vice versa.

The antenna arrangement according to the invention is provided for wireless signal transmission or radio transmission and is suitable and configured for that purpose. The antenna arrangement has an antenna element and an (antenna) substrate.

The antenna element is understood here to mean a radiating element (emitter element, exciter element, receive element) of the antenna arrangement, i.e. an antenna part of the antenna arrangement emitting and/or receiving radiation or electromagnetic waves during antenna operation. The antenna element is designed, in particular, as a miniature antenna, and can be designed here, for example, a patch antenna, a multifilar antenna, a planar antenna, or as an antenna of which the manufacturing steps comprise a deposition process. The antenna element is therefore preferably manufacturable by means of established production methods (e.g. deposition methods for patch antennas).

The antenna element is arranged on the substrate. In particular, the antenna element runs essentially parallel to the substrate. The substrate is therefore arranged below the antenna element. As a ground plane or ground plate, the, in particular electrically insulating, substrate therefore influences, for example, the impedance and the bandwidth of the antenna element by influencing the propagation speed of the electromagnetic waves.

The substrate is an essentially planar or flat ground plate with a base layer and with a substrate layer applied to it. According to the invention, the substrate, in particular the substrate layer, has at least two substrate sections of different substrate types which are arranged in the area of at least one antenna section of the antenna element. The two substrate sections are also referred to here as a substrate section pair.

The term "substrate type" is to be understood here and below to mean, in particular, the substrate material, i.e. the material composition of the substrate or the substrate layer which influences the electrical characteristics of the antenna element, such as the impedance, the bandwidth and the radiation characteristics. The substrate types are selected here, for example, from the following group: dielectric materials, magneto-dielectric materials, fluoropolymers (e.g. PTFE), imides, ferrite materials, ceramic materials, ALX-507 from AGC or Sigma-Aldrich, MAGTREX 555 from Rogers Corporation, or substrate materials which vary their modulating effect on high-frequency waves depending on their alignment relative to the main axis of the antenna element (e.g. a patch made from the same metamaterial, in which the first substrate is rotated through 90° around its normal axis in comparison to the second substrate).

Here, the antenna element has a least one antenna section (antenna arm, antenna branch), in particular on its free end, which is configured, for example, as movable or mobile. The antenna section runs, at least section-by-section, at least over one of the substrate sections.

The antenna arrangement according to the invention therefore has a least two substrate sections of different substrate types, and at least one antenna section. According to the invention, the antenna section and/or the substrate sections are adjustable in relation to one another. The radio-frequency or high-frequency characteristics of the antenna element are thereby adjustable or switchable between different settings. A particularly suitable antenna arrangement is therefore implemented.

The conjunction "and/or" is to be understood here and below to mean that the features linked by means of this conjunction can be designed both jointly and as alternatives to one another.

According to the invention, either the antenna section is therefore adjustable relative to the substrate sections or the substrate sections are adjustable relative to the antenna section or both the antenna section and the substrate sections are designed as adjustable. In one embodiment, in which only the substrate sections are designed as adjustable, it is conceivable, for example, that the antenna section is designed as immovable or rigid. However, the antenna section is preferably designed as movable or deformable.

A particularly reconfigurable antenna arrangement having a multiplicity of actuatable antenna parts (antenna section and/or substrate section) is thereby implemented. The antenna arrangement according to the invention therefore has a particularly high variability, for example in terms of its directional effect or different transmission modes, so that the antenna arrangement can replace a plurality of individual (special) antennas. If, for example, the antenna section or the substrate sections are adjustable, two settings/positions of the antenna parts are in each case conceivable, wherein, if both antenna parts are jointly adjustable, four possible configurations or settings are correspondingly enabled. The displacement size of the substrate sections preferably differs from the displacement size of the radiating antenna sections such that it is relatively less than 0.5 or greater than 2.

Four different settings, for example, are possible, wherein the extreme values 0.5 and 2.0 occur in the case of displacement on the same axis. The antenna section can be displaced, for example, by 1 mm (millimeter), wherein the substrate section is displaceable by at least 2 mm in order to be able to assume four different configurations. The value range of less than 0.5 and greater than 2.0 arises due to the fact that both antenna parts still have an extension in the direction of displacement, and an additional displacement is therefore necessary in order to compensate for the overlap. If the antenna parts are not moved parallel to one another, the values for the displacement size ratios are less than or correspondingly closer to 1 if the antenna parts are displaced at an angle relative to one another, and are minimal (i.e. depending only on the width of the antenna part) if the antenna parts are moved perpendicular to one another.

Due to the (re-)configurability or variability of the antenna arrangement, the antenna arrangement is designable as particularly compact, which is advantageous, particularly in view of installation space restrictions and typical form factors in the case of portable devices (wearables), in particular for use in hearing devices.

The variability of the antenna arrangement relates here, in particular, to the reconfiguration and not to the fine tuning of the antenna parameters. However, the fine tuning can be carried out as an initialization when the antenna arrangement is commissioned (e.g. by setting a series of voltage-tunable capacitors).

For the selective control of parameters of a high-frequency signal, or for controlling the characteristics of the antenna element, parameter sets can be stored or retained in a memory of the antenna arrangement for the reconfiguration or for each antenna section-substrate section setting, wherein each parameter set is assigned to a specific situation or setting.

The antenna section is preferably movable from one substrate section to the other substrate section. The antenna section is therefore movable into different positions or settings. In other words, the geometry of the antenna element is modifiable. In particular, the antenna section is designed here as bendable or deformable. The antenna section is preferably designed here as pivotable in relation to the remaining antenna element.

Different possibilities are conceivable for implementing the adjustability or deformability of the antenna section. The cross-section profile of the deformable antenna section is chosen, for example, such that it meets the mechanical, high-frequency and production requirements of the antenna arrangement. A wire having a circular cross section, for example, can be bent more easily, but is difficult to manufacture using a deposition method. An antenna section having a rectangular cross section meets the high-frequency requirements most effectively if it lies flat and moves parallel to the substrate layer.

The mechanical characteristics for bending are, for example, more easily fulfilled if the surface of the antenna section runs perpendicular rather than parallel to the substrate layer, i.e. if a longitudinal side of the rectangular cross section is oriented perpendicular to the substrate layer. Different configurations are therefore conceivable, for example that the antenna section is pre-bent in a U-shape or L-shape in order to reduce the necessary force for the deformation. Alternatively, the antenna section can be an electrically conducting strip with a 90° rotation (torsion) so that the distal part runs parallel to the substrate and has a high degree of electromagnetic interaction with the underlying substrate, whereas a part which is located closer to an (antenna) feed-in point of the antenna element runs perpendicular to the substrate in order to enable deformability and movement parallel to the ground plane.

In one advantageous embodiment, the antenna section and/or the substrate sections are adjustable relative to one another by means of at least one actuator. This means that the variability of the antenna arrangement is controlled by activating an actuator which, for example, effects a deformation and/or a position change on at least one antenna part. The actuator is designed here, in particular, as an electromechanical actuator, for example as an electro-active polymer, as a piezo crystal, or as a MEMS actuator (MEMS: Micro-Electromechanical System). The actuator is switchable here, for example, between two states.

In one appropriate development, the antenna section is adjustable and/or movable/deformable parallel to the substrate sections and essentially perpendicular to at least one further antenna section of the antenna element, for example an antenna section fixed to the substrate. The actuation of the antenna section therefore results in a movement which runs parallel to the ground plate and the substrate layer and essentially perpendicular to at least one section of the antenna element. As a result, the distance between the antenna section and the substrate is not changed, since the antenna section is moved only from one substrate section to the other substrate section. On one hand, the substrate type therefore changes for the antenna section due to the movement. On the other hand, the shape or geometry of the antenna element changes as such. A substantial modification of the antenna parameters is thereby enabled, even with a slight movement of the antenna section.

The antenna element is therefore only adjusted parallel to the substrate so that the antenna arrangement has a quasi-two-dimensional structure and is therefore designed as particularly compact.

In one preferred embodiment, the antenna section is adjustable between at least two mechanically stable geometric states. The antenna section is therefore bistable. The term "bistable" is understood here and below to mean, in particular, the ability of the antenna section to remain in one of two stable states without itself changing to a different state. Mechanically bistable characteristics are therefore used to produce a well-defined antenna configuration which does not have to be fine-tuned after each reconfiguration.

One geometric state differs from another geometric state such that a radiating part of the antenna element is adjacent to a different substrate type, and/or such that one radiating part of the antenna element has a different position or alignment relative to another radiating part of the antenna element. At least two different mechanically stable states can be assumed for each variable antenna section, wherein a change in the geometric state corresponds to a change in the high-frequency characteristics of the antenna element in that a radiating antenna section is moved over a different substrate type, resulting in different high-frequency characteristics which change the position if the radiating antenna sections relative to one another. Different antenna configurations can be suitable for different scenarios (e.g. different transmission modes or adaptive directional effect) which are typical of use in a hearing device.

The mechanical stability of the geometric states guarantees that the antenna element or the antenna arrangement has well-defined radio-frequency characteristics, even with average manufacturing precision. Furthermore, the antenna arrangement does not have to be fine-tuned after each configuration change, since the states are electromagnetically well-defined due to the mechanically stable states. Fine tuning can be carried out here when the antenna arrangement is first switched on, or occasionally, for example every few hours/days/weeks, in order to take account of manufacturing inaccuracies.

A further advantage of the mechanically stable states is that no additional power consumption is required in order to maintain a specific configuration or setting. The number of actuators for each variable antenna section is preferably identical to the number of stable states. Energy is consequently required for switching only, and not in order to maintain a specific configuration.

An additional or further aspect of the invention provides that the antenna section is connected or coupled to a mechanically deformable element, wherein the antenna section is moved or adjusted if the element is deformed. The deformable element is deformed here, in particular by means of the (electromechanical) actuator, so that the antenna section is actuated by means of the actuator, in particular indirectly via the deformation of the element. The deformation can, for example, be bending, twisting (torsion), compression, shearing or buckling/kinking. The mechanical element can be a deformable radiating part of the antenna element (deformable antenna section) or a deformable attachment to a radiating part of the antenna element.

In one particularly advantageous embodiment, the antenna element has a number of movable antenna sections, i.e. a plurality of movable antenna sections, in particular at least two movable antenna sections, which are adjustable in each case relative to assigned substrate sections or substrate section pairs. A particularly variable, reconfigurable antenna arrangement is thereby implemented which is suitable, in particular, as a miniature antenna for a wearable, portable or mobile computer device which is configured to transmit and/or receive high-frequency signals. The antenna element has a number of variable sections, wherein each section is a radiating part of the antenna element which can preferably be switched with at least one electromechanical actuator between at least two mechanically stable geometric states.

In one conceivable embodiment, the substrate section pairs are arranged in the same way for each variable antenna section, and the antenna arrangement or the antenna element is symmetrical. As a result, only the underlying substrate, but not the position of the antenna sections relative to one another, is thereby changed if all states are switched in the same direction.

In one possible development, the antenna sections of the antenna element are arranged as branched in relation to one another. The term "arranged as branched" or a "branched arrangement" of the antenna sections is understood here and below to mean, in particular, a configuration in the antenna technology in which the beam-steering elements (antenna sections) of the antenna arrangement are divided into a plurality of branches or sections which run in different directions. This branching can serve to influence the radiation characteristic of the antenna arrangement or the antenna element by steering the radiation at different angles or in different directions.

In one suitable development, the antenna arrangement or the antenna element is designed as a multifilar antenna.

The antenna configuration or the branching of the antenna sections is preferably determined by a developing or evolving algorithm. In other words, the antenna geometry is the product of a developing algorithm, wherein the number of radiating antenna sections can be varied in terms of their geometric characteristic.

The geometry and its controllable variation, for example, are chosen such that the antenna arrangement is capable, for example, of covering a broad spectrum of radiation diagrams which are optimized for a specific scene. In particular, an antenna beam steering can thus be controlled. Additionally or alternatively, the antenna arrangement can assume different configurations, wherein at least some configurations are optimized for a specific antenna transmission mode. A space saving or installation space saving is thereby achieved, since the switchover between different transmission modes is therefore simply implementable through adjustment of one or more antenna parts, therefore no additional antennas are required for different transmission modes. Additionally or alternatively, at least some configurations of the antenna arrangement are optimized for a specific signal strength indicator value, a specific power consumption or a combination thereof within a given high-frequency environment (i.e. distance to other transmitters, high-frequency noise, competing sources, obstacles). The power efficiency and the signal strength of the antenna arrangement are thereby optimized.

The antenna arrangement according to the invention is essentially provided, and is suitable and configured, for all portable electrical devices, in particular for audio devices such as, for example, consumer electronics earbuds), or for mobile computing applications or sensor applications, such as, for example, smart phones, tablet computers, smartwatches.

In one preferred application, the antenna arrangement described above is part of the hearing device. The hearing device according to the invention serves here, in particular, to provide care for a user with impaired hearing (hearing aid). The hearing device occurs, for example, as one of the aforementioned types, in particular as a BTE, RIC, ITE or device. Furthermore, the hearing device can also be an implantable or vibrotactile hearing aid.

The hearing device is designed here to receive sound signals from the environment and output them to the user. The hearing device has a (hearing) device housing in which, for example, an input transducer, a signal processing device and an output transducer are accommodated. The device housing is designed such that it can be worn by the user on the head and close to the ear, e.g. in the ear, on the ear or behind the ear.

The input transducer is designed to record sound information from a sound source and convert it into an input signal. The sound information can be sound signals from the environment of the hearing device or of the user (noises, tones, speech, etc.) which are converted by means of the input transducer, for example an electroacoustic transducer, in particular a microphone, into an electrical input signal (audio signal).

An electrical output signal (audio signal) is generated from the electrical input signal by modifying (processing, filtering) the input signal in the signal processing device. The, in particular electroacoustic, output transducer is designed, for example, as a (miniature) loudspeaker in order to generate an acoustic sound signal (output signal) on the basis of the output signal generated (modified, processed, filtered) by the signal processing device.

The antenna arrangement is, for example, part of a transceiver of the hearing device for data transmission via a signaling connection with an external ancillary device, for example with a smartphone, or with a further hearing device in the case of a binaural design. The antenna arrangement can also be designed to receive transmit signals from an induction coil so that the hearing device is wirelessly chargeable.

In one preferred embodiment, the antenna arrangement is designed for a Bluetooth or Wi-Fi connection. In other words, the antenna arrangement is used as a Bluetooth or Wi-Fi antenna.

In one conceivable development, a configuration of the antenna arrangement, i.e. the relative location of the at least one antenna section and the at least two substrate sections, is adjustable on the basis of a location sensor of the hearing device, i.e. a movement sensor and/or an orientation sensor and/or a position sensor. If the antenna arrangement is used in the hearing device, it is conceivable, for example, for the state switchover or configuration switchover of the adjustable antenna parts (antenna section, substrate section) to be controlled depending on a head movement or body movement of the hearing device user. A location sensor, for example, designed as a movement sensor of the hearing device, for example an inertial measuring unit, is provided for this purpose and is coupled accordingly to the antenna arrangement or to a controller controlling the adjustment or configuration.

In one possible development, a trained neural network, for example, is stored in the controller to predict or anticipate future head/body movements from the current head movements or body movements. The neural network is trained here, for example, for different ambient conditions and the movement sequences that have occurred therewith in the past. A predetermined map, for example, of radio frequency signal strength indicators for a specific location is further possible here. This is possible particularly if the location sensor is designed as a position sensor and/or orientation sensor (e.g. gyroscope, magnetometer, ultra-wideband system, GPS, etc.), since this sensor is provided and configured to determine a position and/or orientation in space.

Other features which are considered as characteristic for the invention are set forth in the appended claims.

Although the invention is illustrated and described herein as embodied in an antenna arrangement for wireless signal transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Matching parts and quantities are always denoted in all figures with the same reference symbols.

DETAILED DESCRIPTION OF THE INVENTION

Figure 1:
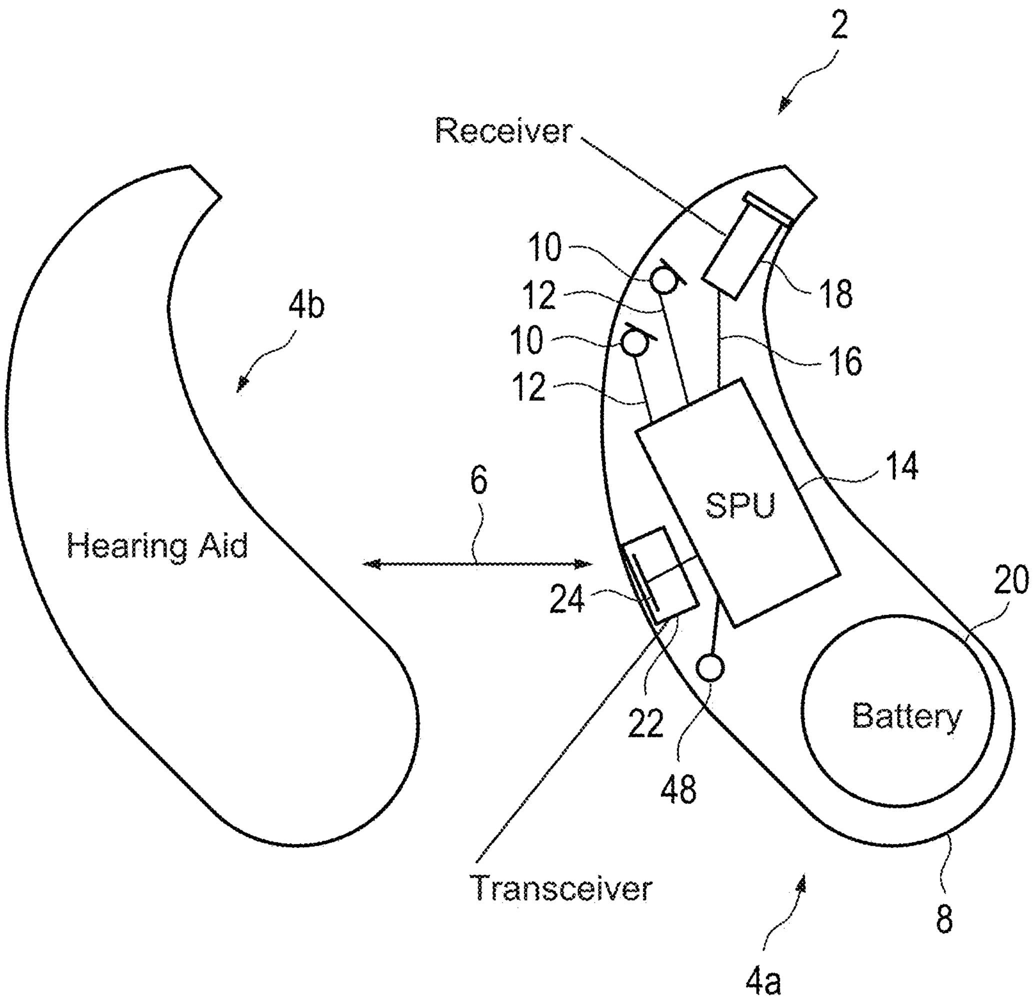
FIG. 1 is an illustration of a hearing device.

Referring now to the figures of the drawings in detail and first, particularly to FIG. 1 thereof, there is shown a basic design of a hearing device 2 according to the invention. In this exemplary embodiment, the hearing device 2 is configured as a binaural hearing aid apparatus having two signal-coupled hearing aid devices or individual devices 4*a*, 4*b*. The individual devices 4*a*, 4*b* are designed here by way of example as behind-the-ear (BTE) hearing aids. The individual devices 4*a*, 4*b* are coupled or couplable to one another by means of a wireless signaling communication connection 6.

The communication connection 6 is designed, for example, as an inductive coupling between the individual devices 4*a* and 4*b*, or alternatively the communication connection 6 is designed, for example, as a radio connection, in particular as an inductive, Bluetooth or RFID connection, between the individual devices 4*a* and 4*b*.

The design of the individual devices 4*a*, 4*b* is explained below by way of example with reference to the individual device 4*a*. As shown schematically in FIG. 1, the individual device 4*a* includes a device housing 8 into which one or more microphones, also referred to as (acoustoelectric) input transducers 10, are installed. Sound information in an environment of the hearing device 2 is recorded with the input transducers 10 and is converted into electrical acoustic data as input signals 12.

The input signals 12 are processed by a controller of a signal processing device 14 which is similarly arranged in the device housing 10. On the basis of the input signals 12, the signal processing device 14 generates an output signal 16 which is forwarded to a loudspeaker or receiver 18. The receiver 18 is designed here as an (electroacoustic) output transducer 18 which converts the electrical output signal 16 into an acoustic signal or sound signal and outputs it to a (hearing device) user. In the BTE device 4*a*, the acoustic signal is transmitted to the eardrum of a hearing system user, possibly via a sound tube or external receiver (not shown in detail) containing an earmold positioned in the auditory canal. However, an electromechanical output transducer 18, for example, is also conceivable as a receiver, as in the case, for example, of a bone-conduction receiver.

The energy supply of the individual device 4*a* and, in particular, the signal processing device 14, is provided by means of a battery 20 accommodated in the device housing 8.

The signal processing device 14 is fed via a signaling connection to a transceiver 22. The transceiver 22 serves, in particular, to transmit and receive wireless signals by means of the communication connection 6.

The transceiver 22 is provided and configured to implement different transmission modes and/or different transmit and/or receive characteristics. The transceiver 22 is suitable and configured, for example, for a Bluetooth, RFID, Wi-Fi or induction connection. The transceiver 22 can further be designed, for example, as a T-coil, or for receiving streaming signals. This means that not only the communication connection 6 to the individual device 4*b*, but also other radio, data, signal or communication connections to other devices (smartphone) or networks (e.g. Internet) are implementable by means of the transceiver 22. For this purpose, the transceiver 22 has a reconfigurable antenna arrangement 24 which is integrated as a miniature antenna into the device housing 8.

Figure 2:
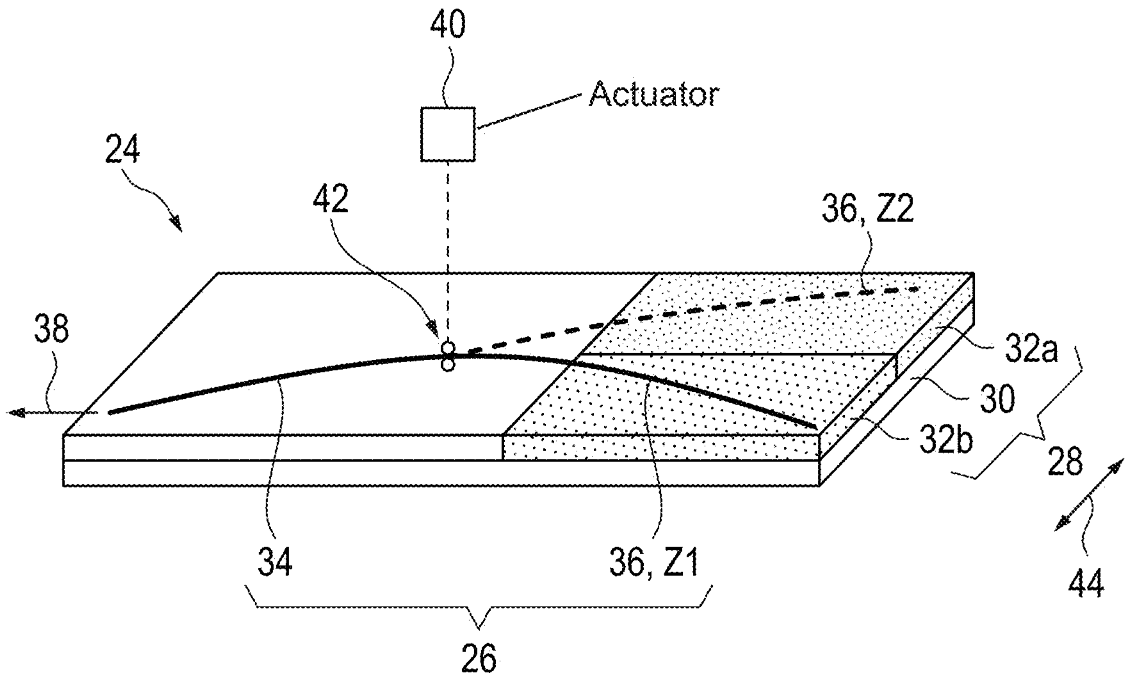
FIG. 2 is a perspective view of an antenna arrangement of the hearing device, having a movable antenna section.

FIG. 2 shows sections of a first embodiment of the antenna arrangement 24. In the following embodiments, the antenna arrangement 24 is described, in particular, as a transmit antenna. However, the antenna arrangement 24 is also usable accordingly as a receive antenna or preferably as a combined transmit and receive antenna.

The antenna arrangement 24 is provided for wireless signal transmission or radio transmission, and is suitable and configured for that purpose. The antenna arrangement 24 has at least one antenna element 26 and at least one (antenna) substrate 28.

The antenna arrangement 24 has a quasi-two-dimensional structure, wherein the antenna element 26 is arranged on the substrate 28. In particular, the antenna element 26 runs essentially parallel to the substrate 28.

The substrate 28 is an essentially planar or flat ground plate with a base layer 30 and with a substrate layer applied thereto. According to the invention, the substrate 28, in particular the substrate layer, has at least two substrate sections 32*a*, 32*b* of different substrate types.

In the embodiment shown in FIG. 2, the antenna element 26 has two antenna sections 34 and 36 which merge into one another in one piece, i.e. in one part or monolithically. Here, at least the antenna sections 34, 36 form the radiating (emitting, receiving) part of the antenna element 26 which is supplied with transmit signals from the transceiver 22 at a feed-in point 38, wherein the transmit signals propagate along the antenna element 26 and are emitted by the antenna sections 34, 36 as an electromagnetic wave.

The antenna section 34 is fixed to the substrate 28 or to the substrate layer. In other words, the antenna section 34 is arranged or held rigidly or immovably on the substrate 28.

The antenna section 36 on the free end is arranged here as movable or mobile on the substrate 28 or the substrate layer. In other words, the antenna section 38 is arranged essentially loosely on the substrate 28.

The antenna section 36 is coupled to an actuator 40, in particular to an electromechanical actuator. By means of the actuator 40, the antenna section 36 is reversibly adjustable between a first (antenna) position (configuration) or geometric state Z1, in which the antenna section 36 is arranged, for example, above the substrate layer 32*b*, and a second position or geometric state Z2, in which the antenna section 36 is adjustably arranged, for example above the substrate layer 32*a*. In particular, the antenna section 36 is deformed, preferably twisted or bent, here. The state Z1, in which the antenna section 36 in FIG. 2 is guided over the substrate layer 32*b*, is shown with a continuous line, whereas the state Z2, in which the antenna section 36 in FIG. 2 is guided over the substrate layer 32*a*, is shown with a dotted line.

The antenna section 36 is adjustable or deformable or bendable by means of the actuator 40 parallel to the substrate layers 32*a*, 32*b* and essentially perpendicular to at least the adjacent antenna section 34. The actuation of the actuator 40 therefore results in a movement of the antenna section 36 which runs parallel to the substrate 28 and essentially perpendicular to the antenna section 34. The antenna element 26 is pivotably mounted here by means of a substrate-fixed bracket 42 at the transition between the antenna sections 34, 36 so that the antenna section 36 on the free end is pivotable relative to the fixed antenna section 34 between the geometric states Z1 and Z2.

The actuator 40 can additionally or alternatively be provided and configured to move the substrate sections 32*a*, 32*b* so that, for example in the state Z1, the substrate layer 32*a* is moved under the antenna section 36. This is indicated schematically in FIG. 2 with a double arrow 44. In other words, the antenna section 36 and/or the substrate sections 32*a*, 32*b* are adjustable relative to one another. The radio-frequency or high-frequency characteristics of the antenna element 26 are thereby adjustable or switchable between different settings.

The antenna geometry of the antenna element 26, on one hand, changes due to the adjustment of the antenna section 36. The electrical characteristics of the antenna element 26, in particular its impedance, the bandwidth and the radiation characteristics are changed as a result. In addition, the electrical characteristics of the antenna element 26 also change due to the different substrate type in the transition from the substrate section 32*a* onto the substrate section 32*b* and vice versa.

Different possibilities are conceivable for implementing the adjustability or deformability of the antenna section 36. The cross-section profile of the deformable antenna section 36 is chosen, for example, such that it meets the mechanical, high-frequency and production requirements of the antenna arrangement 24.

Different exemplary embodiments of the antenna element 26 are explained in detail below with reference to FIGS. 3 to 7. The actuator 40 and the substrate 28, in particular the substrate sections 32*a*, 32*b*, are not shown in FIGS. 3 to 7

The antenna element 26 or the antenna section 36 can be designed, for example, as a round wire, i.e. a wire having a circular cross section. The antenna section 36 is simply bendable as a result.

Figure 3:
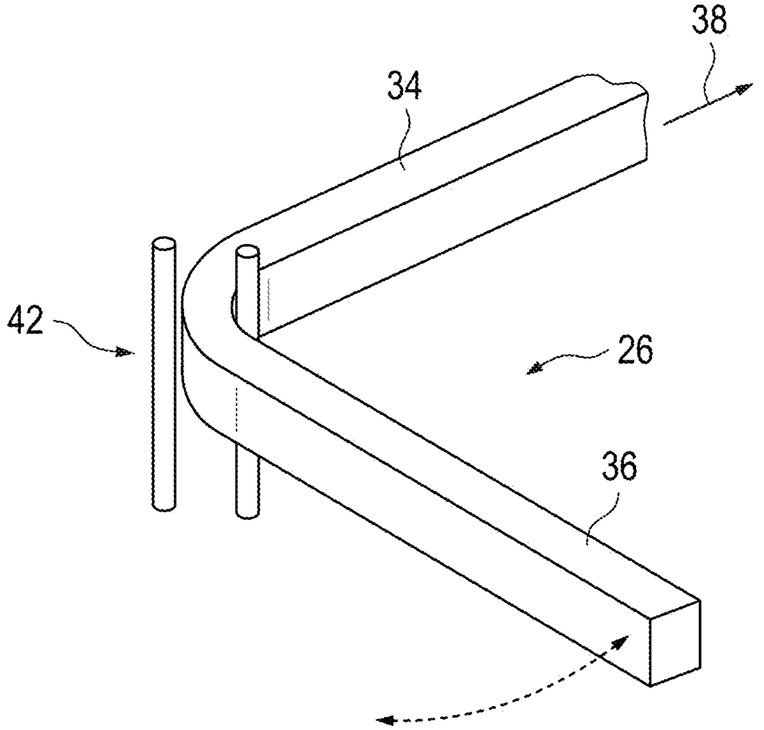
FIG. 3 is a perspective view of a first embodiment of the movable antenna section.

FIG. 3 shows an embodiment of the antenna element 26 in which the antenna section 36 is made from a shaped wire, in particular having a rectangular cross section. The rectangular cross-section shape meets the high-frequency requirements for the antenna arrangement 24 most effectively here if it lies flat and moves parallel to the substrate layer. The mechanical requirements for the deformation or bending are more easily met, for example, if the surface of the antenna section 36 runs perpendicular rather than parallel to the substrate layer, i.e. if a longitudinal side of the rectangular cross section is oriented perpendicular to the substrate layer. Different configurations are therefore conceivable, e.g. the antenna section 36 is pre-bent in a U-shape or L-shape in order to reduce the force necessary for the deformation.

Figure 4:
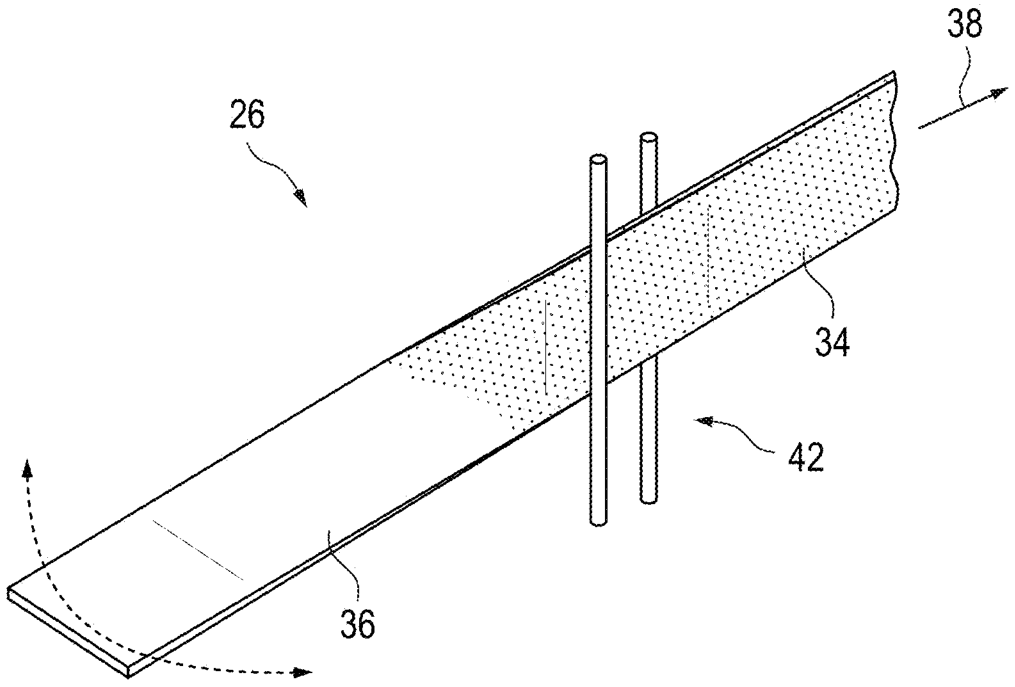
FIG. 4 is a perspective view of a second embodiment of the movable antenna section.

FIG. 4 shows an alternative design of the antenna element 26, in which the antenna section 36 is implemented as an electrically conducting strip which is designed with a 90° rotation (torsion) in the area of the bracket 42. The distal part (on the free end) runs parallel to the substrate 28, i.e. the longitudinal sides of the strip are arranged parallel to the substrate layer, thereby guaranteeing a high degree of electromagnetic interaction with the underlying substrate section 32*a*, 32*b* or substrate type. The antenna section 34 is formed here by the established strip area which runs perpendicular to the substrate 28, i.e. its longitudinal side is arranged perpendicular to the substrate layer. This enables the deformability and movement parallel to the substrate sections 32*a*, 32*b*.

Figure 5:
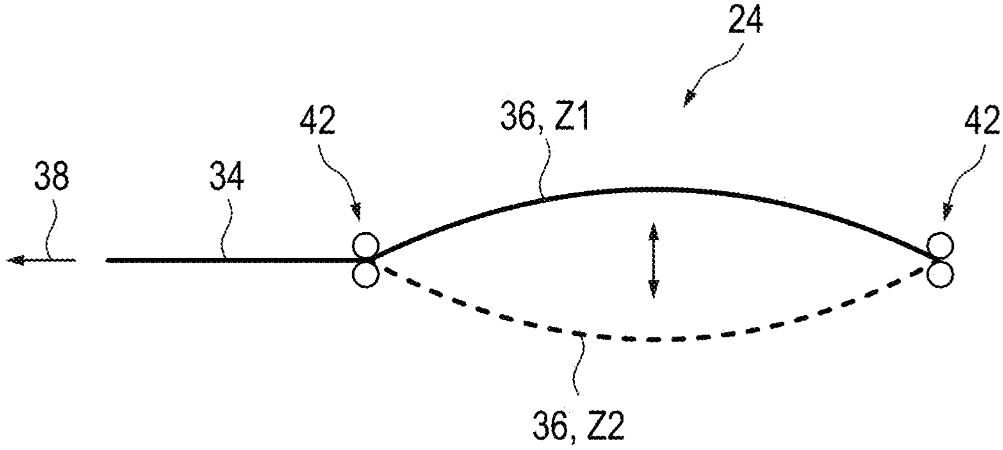
FIG. 5 is an illustration showing a third embodiment of the movable antenna section.

In the exemplary embodiment shown in FIG. 5, the antenna section 36 is held or clamped on both sides, i.e. on both section ends, by means of a bracket 42. The antenna section is designed here as bistable having two mechanically stable geometric states Z1, Z2, and is adjustable or switchable between these states. The antenna section 36 is indicated with a continuous line in the state Z1, and with a dotted line in the state Z2.

The antenna section 36 is not pivoted here, but is bent or deformed such that the antenna section 36 runs bulged or curved between the brackets 42, wherein a change between a concave and convex curve takes place in a transition between the states Z1 and Z2. In this embodiment, the antenna section 36 is preferably deformed or adjusted directly, i.e. immediately, by means of the actuator 40. This means that the actuator 40 has to feed only a deformation energy for the switchover between the states Z1, Z2, but does not have to provide any energy in the states Z1, Z2 themselves for the stabilization of the states Z1, Z2.

Figure 6:
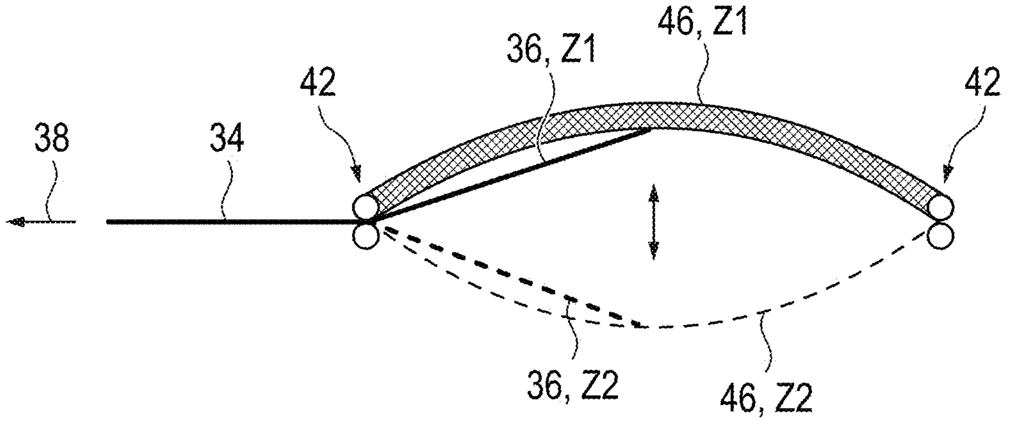
FIG. 6 is an illustration showing a fourth embodiment of the movable antenna section.

In the exemplary embodiment shown in FIG. 6, the antenna section 36 is attached to a mechanically deformable element 46. The element 46 is clamped or arranged here between two spaced brackets 42. The antenna section 36 is arranged on its fixed end on one of the brackets 42, and is coupled on its free end to the element 46.

The element 46 is adjustable between two mechanically stable geometric states Z1, Z2 so that the coupled antenna section 36 is carried along accordingly between the states Z1 and Z2. The element 46 is therefore designed as bistable. The element 46 and the antenna section 36 are indicated with continuous lines in the state Z1 and with a dotted (element) or dashed (antenna section) line in the state Z2.

The mechanically deformable element 46 is (mechanically) deformed here, in particular by means of the actuator 40, so that the antenna section 36 is actuated by means of the actuator 40, in particular indirectly via the deformation of the element 46. The deformation can be, for example, bending, twisting (torsion), compression, shearing or buckling/kinking. In the exemplary embodiment shown, the deformation is a curving or bending of the element 46, wherein the states Z1 and Z2 are a concave and a convex curving between the brackets 42.

Figure 7:
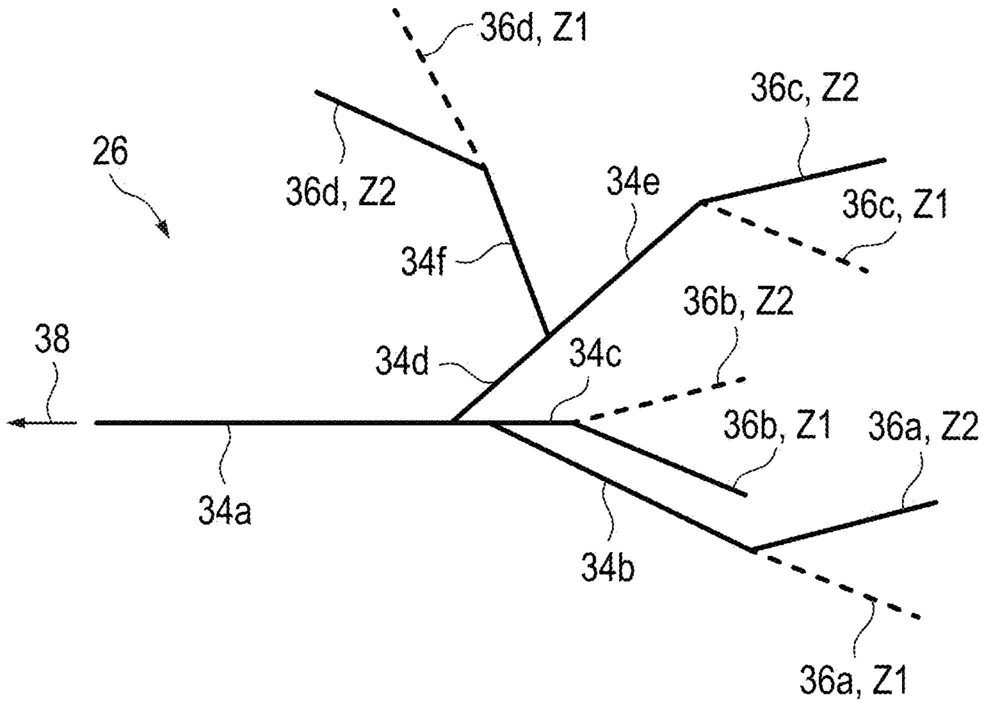
FIG. 7 is an illustration showing the antenna arrangement having a plurality of branched antenna sections.

FIG. 7 shows a multifilar design of the antenna element 26 having a number of branched antenna sections 34, 36.

In the exemplary embodiment shown in FIG. 7, the antenna element 26 has six antenna sections 34*a*, 34*b*, 34*c*, 34*d*, 34*e* and 34*f* arranged fixed or stationary on the substrate 28.

The antenna element 26 further has four adjustable (bendable, deformable) antenna sections 36*a*, 36*b*, 36*c* and 36*d* which are adjustable in each case between two geometric states Z1, Z2 which are preferably in each case mechanically stable. An actuator 40 is preferably assigned here in each case to an antenna section 36*a*, 36*b*, 36*c*, 36*d*.

The antenna section 34*a* is guided on the feed-in side to the feed-in point 38. The antenna section 34*a* branches here into the antenna sections 34*b*, 34*c*, and 34*d*. The antenna section 34*c* runs here linearly and coaxially to the antenna section 34*a*, wherein the antenna sections 34*d* and 34*b* run angled or inclined toward different sides. The antenna section 34*d* branches here into the antenna sections 34*e* and 34*f*.

The antenna section 36*a* is arranged at its free end on the antenna section 34*b*. The antenna section 36*b* forms the free end of the antenna section 34*c*. The antenna section 36*c* is arranged at its free end on the antenna section 34*e*, wherein the antenna section 36*d* is positioned at the free end of the antenna section 34*f*.

A substrate section pair, for example with the substrate sections 32*a*, 32*b*, is preferably assigned to each antenna section 36*a*, 36*b*, 36*c*, 36*d*. The substrate types of the substrate section pairs can differ here for the antenna sections 36*a*, 36*b*, 36*c*, 36*d*.

The antenna sections 36*a*, 36*b*, 36*c*, 36*d* can be of different designs. The antenna sections 36*a*, 36*b*, 36*c*, 36*d* can, for example, have different lengths. The antenna sections 36*a*, 36*b*, 36*c*, 36*d* can also be designed, for example, according to the exemplary embodiments shown in FIG. 5 or FIG. 6.

It is similarly possible for one or more of the antenna sections 36*a* to be switchable or adjustable between more than two mechanically stable geometric states. It is further possible for the substrate sections assigned to the antenna sections 36*a*, 36*b*, 36*c*, 36*d* to be adjustable, wherein more than two different substrate sections or substrate types can also be assigned to one antenna section 36*a*, 36*b*, 36*c*, 36*d*.

The antenna configuration or the branching geometry of the antenna element 26 or of the antenna sections 34*a*, 34*b*, 34*c*, 34*d*, 34*e*, 34*f* and 36*a*, 36*b*, 36*c*, 36*d* is preferably the result of a developing or evolving algorithm which has chosen or optimized the configuration or states Z1, Z2 and arrangements of the antenna sections 34*a*, 34*b*, 34*c*, 34*d*, 34*e*, 34*f* and 36*a*, 36*b*, 36*c*, 36*d* such that the antenna arrangement 24 is capable of covering a broad spectrum of radiation diagrams which are optimized for a specific scene. One or more configurations, for example, are provided which are optimized for a specific antenna transmission mode and/or which are optimized for a specific signal strength indicator value, a specific power consumption or a combination thereof within a given high-frequency environment.

In one conceivable application, the configuration of the antenna arrangement 24, i.e. the states Z1, Z2 of the antenna sections 36*a*, 36*b*, 36*c*, 36*d*, are set on the basis of a movement sensor 48 of the hearing device 2. The state switchover or configuration switchover of the adjustable antenna parts (antenna section, substrate section) is preferably controlled depending on a head movement or body movement of the hearing device user. A location sensor 48 designed as a movement sensor, for example an inertial measuring unit, is arranged in the device housing 8 for this purpose. The location sensor 48 is coupled, for example, indirectly via the signal processing device 18 and the transceiver 22 to the antenna arrangement 24.

The claimed invention is not limited to the exemplary embodiments described above. On the contrary, other variants of the invention can be derived therefrom by a person skilled in the art within the scope of the disclosed claims without departing the subject-matter of the claimed invention. In particular, all individual features described in connection with the different exemplary embodiments are further combinable in other ways within the scope of the disclosed claims without departing the subject-matter of the claimed invention.

The following is a summary list of reference numerals and the corresponding structure used in the above description of the invention:

2 Hearing device
4*a*, 4*b* Individual device
6 Communication connection
8 Device housing
10 Input transducer
12 Input signal
14 Signal processing
16
Output signal
Receiver/output transducer
18
20 Battery
22 Transceiver
24 Antenna arrangement
26 Antenna element
28 Substrate
30 Base layer
32*a*, 32*b* Substrate section
34, 34*a* . . . 34*f* Antenna section
36, 36*a* . . . 36*d* Antenna section
38 Feed-in point
40 Actuator
42 Bracket
44 Double arrow
46 Element
48 Location sensor
Z1, Z2 Geometric state

The invention claimed is:

1. An antenna configuration for wireless signal transmission in a hearing device, the antenna configuration comprising:

a planar substrate;

an antenna element disposed on said planar substrate, said antenna element having at least one antenna section;

wherein said planar substrate contains at least a first substrate section and a second substrate section different from said first substrate section and disposed in a region associated with said at least one antenna section; and at least one actuator configured to move said at least one antenna section and said first and second substrate sections relative to one another.

2. The antenna configuration according to claim 1, wherein said at least one antenna section is one of a plurality of antenna sections, a first of said antenna sections runs parallel to said substrate sections and generally perpendicular to at least one second of said antenna sections of said antenna element.

3. The antenna configuration according to claim 1, wherein said at least one antenna section is adjustable between two mechanically stable geometric states.

4. The antenna configuration according to claim 1, further comprising a mechanically deformable element, said at least one antenna section is connected to said mechanically deformable element which, when deformed, adjusts said at least one antenna section.

5. The antenna configuration according to claim 1, wherein said at least one antenna section is one of a plurality of movable antenna sections which are adjustable in each case relative to an assigned one of said substrate sections.

6. The antenna configuration according to claim 5, wherein said movable antenna sections of said antenna element are disposed branched in relation to one another.

7. A hearing device, comprising:

an antenna configuration for wireless signal transmission, said antenna configuration containing:

a planar substrate;

an antenna element disposed on said planar substrate, said antenna element having at least one antenna section;

wherein said planar substrate contains at least a first substrate section and a second substrate section different from said first substrate section and disposed in a region associated with said at least one antenna section; and at least one actuator configured to move said at least one antenna section and said first and second substrate sections relative to one another.

8. The hearing device according to claim 7, wherein said antenna configuration is configured for a Bluetooth or Wi-Fi connection.

9. The hearing device according to claim 7, further comprising a location sensor, a configuration of said antenna configuration is adjustable on a basis of said location sensor.

10. The hearing device according to claim 7, wherein the hearing device is a hearing aid.

* * * * *